(12) United States Patent
Schubert

(10) Patent No.: US 12,479,671 B2
(45) Date of Patent: Nov. 25, 2025

(54) CONNECTION DEVICE FOR TRANSFERRING BULK MATERIAL GOODS AND PORT SYSTEM

(71) Applicant: ATEC PHARMATECHNIK GMBH, Soerup (DE)

(72) Inventor: Peter Hans-Ludwig Schubert, Flensburg (DE)

(73) Assignee: ATEC PHARMATECHNIK GMBH, Soerup (DE)

( * ) Notice: Subject to any disclaimer, the term of this patent is extended or adjusted under 35 U.S.C. 154(b) by 0 days.

(21) Appl. No.: 18/840,918

(22) PCT Filed: Feb. 24, 2023

(86) PCT No.: PCT/DE2023/200040
§ 371 (c)(1),
(2) Date: Aug. 23, 2024

(87) PCT Pub. No.: WO2023/160762
PCT Pub. Date: Aug. 31, 2023

(65) Prior Publication Data
US 2025/0162821 A1 May 22, 2025

(30) Foreign Application Priority Data
Feb. 25, 2022 (DE) .................... 10 2022 104 628.1

(51) Int. Cl.
*B65G 53/40* (2006.01)
(52) U.S. Cl.
CPC .................... *B65G 53/40* (2013.01)

(58) Field of Classification Search
CPC ....... B65G 53/40; B65G 69/181; B01L 3/505; B01L 2200/026; B01L 2200/0647; B01L 2200/141
See application file for complete search history.

(56) References Cited

U.S. PATENT DOCUMENTS 8,397,769 B2 * 3/2013 Catelli .................... F16L 11/20
285/55
11,884,428 B2 * 1/2024 Colonna .................. B65B 1/28
2021/0290487 A1 9/2021 Colonna et al.

FOREIGN PATENT DOCUMENTS

DE 91 03 640.2 U1 6/1991
DE 10 2020 127 213 A1 2/2022
(Continued)

*Primary Examiner* — Jason K Niesz
(74) *Attorney, Agent, or Firm* — Norman B. Thot

(57) ABSTRACT

A connection device includes a through-passage frame to guide goods through a through-passage, and a holding bag providing the goods. The through-passage frame includes a connection side, a rear side, an inner surface facing the through passage, and an outer surface facing away therefrom between the connection side and the rear side. When connected, the connection side faces the receiving port, the rear side faces away therefrom, and a through-passage direction extends from the rear to the connection side. The holding bag includes a film-type main body on the rear side which has a connection region connected to the through-passage frame via a connection. The film-type main body is guided from the rear side along the through-passage direction, through the through-passage, to the connection side, so that the connection region bears at least partially against the connection side, and the connection is arranged behind the through-passage along the through-passage direction.

12 Claims, 3 Drawing Sheets

(56) References Cited

FOREIGN PATENT DOCUMENTS

EP  3 000 739 A1  3/2016
EP  3 444 210 A1  2/2019

* cited by examiner

CONNECTION DEVICE FOR TRANSFERRING BULK MATERIAL GOODS AND PORT SYSTEM

CROSS REFERENCE TO PRIOR APPLICATIONS

This application is a U.S. National Phase application under 35 U.S.C. § 371 of International Application No. PCT/DE2023/200040, filed on Feb. 24, 2023 and which claims benefit to German Patent Application No. 10 2022 104 628.1, filed on Feb. 25, 2022. The International Application was published in German on Aug. 31, 2023 as WO 2023/160762 A1 under PCT Article 21(2).

FIELD

The present invention relates to a connection device for transferring bulk material goods into a receiving port along a through-passage direction with a through-passage frame for guiding the bulk material goods through a through-passage with a through-passage axis and a holding bag for providing the bulk material goods, wherein the through-passage frame has a connection side, a rear side, and a respective inner surface facing the through-passage axis and outer surface facing away from the through-passage axis and arranged between the connection side and the rear side, and, in a connected position, the connection side is facing the receiving port and the rear side is facing away from the receiving port and the through-passage direction runs from the rear side to the connection side, wherein the holding bag has a film-type main body arranged on the rear side and with a connection region, and the connection region is securely connected to the through-passage frame via a connection. The present invention also relates to a port system with a receiving port and such a connection device.

BACKGROUND

Connection devices and associated transfer devices for transferring bulk material goods are used to transfer bulk or free-flowing material goods, such as stoppers, connectors, or other small parts, particularly in the field of sterile technology, through so-called pick-up ports while maintaining the sterility of the corresponding goods. Corresponding connection devices are used for this purpose, which are then connected, applied or otherwise connected to a pick-up port in order to then, for example, transfer corresponding goods from a bag connected to the connection device into the pick-up port.

Connection devices are also known in which, for example, a retaining bag is radially attached and welded to the outside of a piece of pipe or a flange piece along a through-passage direction or a through-passage axis. This creates a shoulder or undercut in the direction of flow in which bacteria, dirt, or other contaminants can collect along the direction of flow. Cleaning and sterilization are correspondingly difficult.

SUMMARY

An aspect of the present invention is to improve the prior art.

In an embodiment, the present invention provides a connection device for transferring bulk material goods into a receiving port along a through-passage direction. The connection device includes a through-passage frame and a holding bag. The through-passage frame is configured to guide the bulk material goods through a through-passage having a through-passage axis. The through-passage frame comprises a connection side, a rear side, an inner surface which is arranged to face the through-passage axis, and an outer surface which is arranged to face away from the through-passage axis between the connection side and the rear side. In a connected position, the connection side faces the receiving port, the rear side faces away from the receiving port, and the through-passage direction extends from the rear side to the connection side. The holding bag is configured to provide the bulk material goods. The holding bag comprises a film-type main body which is arranged on the rear side. The film-type main body comprises a connection region which is configured to be securely connected to the through-passage frame via a connection. The film-type main body is configured to be guided from the rear side along the through-passage direction, through the through-passage, and to the connection side, so that the connection region bears at least partially against the connection side, and the connection is arranged behind the through-passage along the through-passage direction.

BRIEF DESCRIPTION OF THE DRAWINGS

The present invention is described in greater detail below on the basis of embodiments and of the drawings in which.

DETAILED DESCRIPTION

Figure 1:
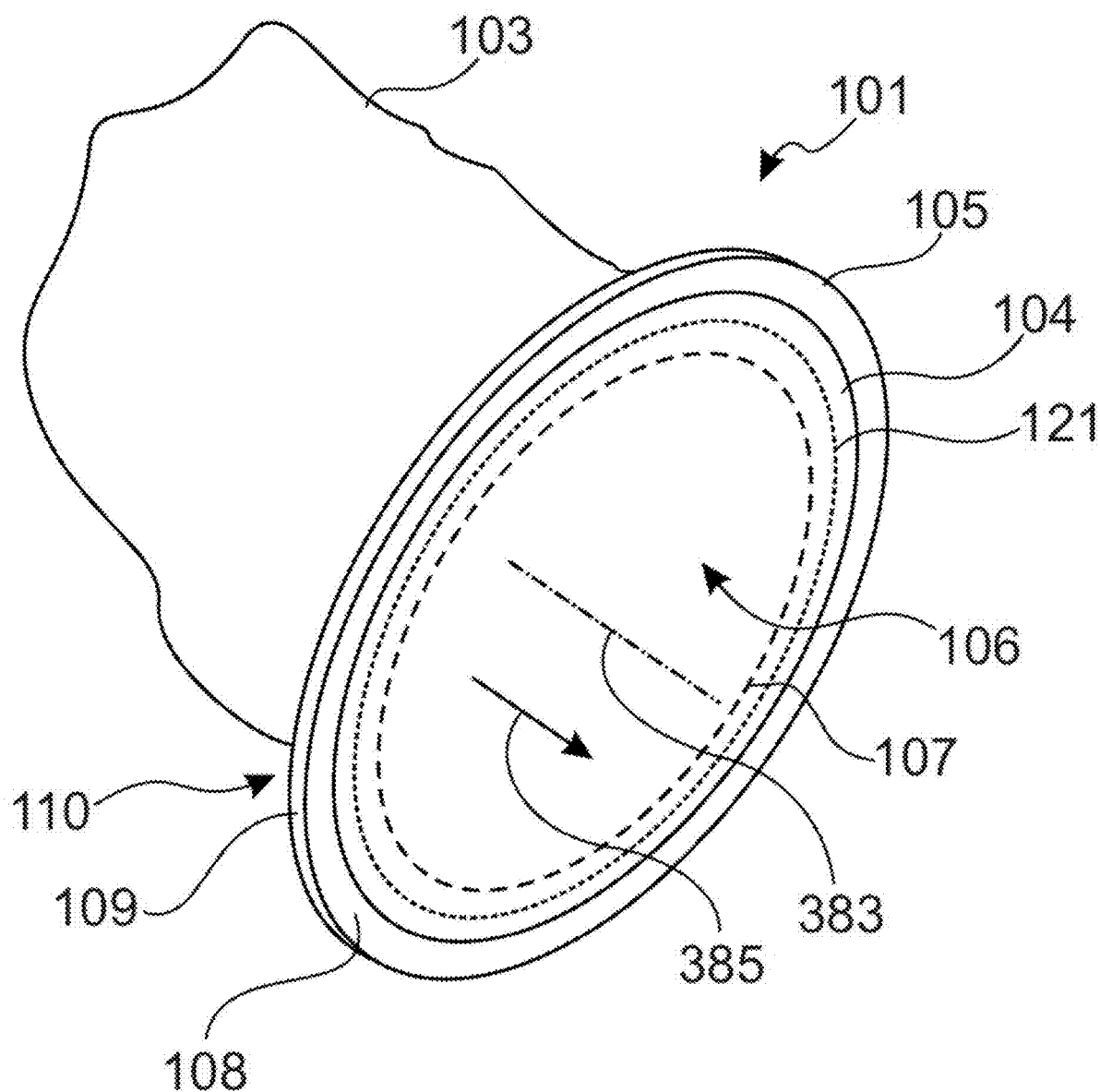
FIG. 1 shows a schematic representation of a transfer device with a film bag and a through-passage frame in an isometric view.

The present invention provides a connection device for transferring bulk material goods into a receiving port along a through-passage direction with a through-passage frame for guiding the bulk material goods through a through-passage with a through-passage axis and a holding bag for providing the bulk material goods, wherein the through-passage frame has a connection side, a rear side, and a respective inner surface facing the through-passage axis and outer surface facing away from the through-passage axis and arranged between the connection side and the rear side, and, in a connected position, the connection side is facing the receiving port and the rear side is facing away from the receiving port and the through-passage direction runs from the rear side to the connection side, wherein the holding bag has a film-type main body arranged on the rear side and with a connection region, and the connection region is securely connected to the through-passage frame via a connection, wherein the film-type main body is guided from the rear side along the through-passage direction, through the through-passage and to the connection side, so that the connection region bears at least partially against the connection side and the connection is arranged behind the through-passage along the through-passage direction.

By guiding the film-type main body from the rear side along the through-passage direction through the through-passage and up to the connection side, it is possible for the connection region to at least partially bear against the connection side and for the connection, which connects the connection region to the through-passage frame, to be created so that a free flow of corresponding bulk or free-flowing material goods through the connection device into the receiving port is possible. There is in particular no obstruction to the flow of the bulk material goods through the connection. An important concept of the present invention is to guide the connection region of the holding bag, for example, a connection region connected to the film-type main body, around the through-passage frame and to then connect it to the through-passage frame in an area which is arranged outside the through-passage and "behind" the through-passage frame when viewed from the direction of the film-type main body.

The following terms are explained:

A "connection device" for transferring bulk material goods is, for example, a device which is designed with a bag for bulk material goods via which the bulk material goods, such as stoppers or other articles requiring sterilization in the field of sterile and medical technology, can be connected to a receiving port, i.e., to a coupling device. The connection device is used to provide a secure connection between the receiving port and the connection device, wherein in particular sterility requirements must be met with regard to the transfer of the bulk material goods.

The "transfer" of bulk material goods refers here to the physical process of moving the bulk material into the receiving port or through the receiving port. This transfer takes place along a "through-passage direction", wherein this through-passage direction indicates the global course of the transfer and need not describe a mathematically exact direction. The through-passage direction rather in particular refers to the path of the bulk material goods in relation to the pick-up port, for example, along a pouring parabola or a pouring path.

A "through-passage frame" here refers to the part of the connection device that is designed like a frame and spans a "through-passage". The through-passage frame can in particular be coupled directly to the corresponding port, for example, via a sealed bayonet lock as is common in sterile technology. This allows the bulk material goods to pass through the through-passage frame and thus also through the through-passage during transfer. The geometric reference of the through-passage as well as the through-passage frame is a "through-passage axis" which describes, for example, a main axis of the through-passage frame and/or the connection device from the rear to the connection side. The through-passage axis describes, for example, a mathematically idealized axis which indicates an idealized course along the through-passage direction.

A "holding bag" is used to provide the bulk material goods and is designed, for example, as a plastic bag or a film bag which is fastened or attached to the through-passage frame. The "connection side" in this context refers to the side of the connection device facing the receiving port, wherein a "rear side" refers to a supply side, for example, the side of the retaining bag. The through-passage frame has an "inner surface", i.e., a surface facing the through-passage axis, and an "outer surface", i.e., a surface facing away from the through-passage axis, wherein this also refers, for example, to the inside and outside of the tubular through-passage frame or at least a portion of the tubular through-passage frame.

The retaining bag which, for example, has a film-type main body, additionally has a "connection region" which serves for a secure connection to the through-passage frame. "Securely" here refers to a mechanical attachment of the connection region to the through-passage frame which is realized via a "connection". Such a connection is, for example, an adhesive connection, a clamp connection, or a welded connection, which enables the film-type main body to be mechanically fixed to the through-passage frame via the connection region.

The present invention provides that the film-type main body is guided through the through-passage from the rear side along the through-passage direction and is thus arranged "behind the through-passage" so that the film-type main body is in particular guided through the through-passage along the through-passage axis and is in particular guided at least partially around the through-passage frame so that a trouble-free flow of the bulk material goods through the through-passage is in particular made possible and the flow is in particular not disturbed by the connection.

In an embodiment of the present invention, the connection can, for example, be arranged on the connection side and/or the connection region can, for example, be routed around the through-passage frame up to the outer side or up to the rear side so that the connection or also a further connection or further connections is or are each arranged on the outer side and/or on the rear side.

This provides additional security and the connection is arranged geometrically even further away from the bulk material goods so that interference with the transfer or, for example, the occurrence of sterility problems due to particles and/or microorganisms adhering in the region of the connection outside the through-passage frame and thus outside the transfer path of the bulk material goods is avoided.

In an embodiment of the present invention, the connection can, for example, be a welded connection, an adhesive connection, or a form-fitting and/or frictionally engaged plug-in connection. In the case of a form-fitting and/or frictionally engaged plug-in connection, a further embodiment of the present invention provides that a retaining element can, for example, be used to create a plug-in connection by inserting or pressing the retaining element into a recess in the connecting frame. The film-type main body and/or the connection region are clamped or pressed in between the retaining element and the plug-in connection so that a secure and, for example, liquid-tight connection is provided.

A "welded connection" is an integrally bonded connection which is in particular achieved by melting the base material, and is produced, for example, by welding the film-type main body to the through-passage ring using ultrasonic welding and/or thermal welding. An "adhesive connection" in this context is an adhesive or cohesive connection in particular via a chemical and/or physically active adhesive. A "plug-in connection" can be achieved, for example, via a plug-in ring as a retaining element via which the connection region of the film-type main body is clamped in a receptacle of the through-passage ring which is formed as an annular recess.

In an embodiment of the present invention, the retaining element itself can, for example, be partially annular or annular, depending on which design is selected for the film-type main body and/or the connection region. The film-type main body and/or the connection region can, for example, have a partially annular cross-section or an annular cross-section, wherein the partially annular cross-section can be used to form a filler bag for further external filling with, for example, non-sterile goods, or a completely annular cross-section can form a closed bag.

In an embodiment of the present invention, the through-passage frame can, for example, have a first coupling device on the connection surface and/or on the outer surface for coupling the connection device to a second coupling device which is assigned to the receiving port and corresponding to the first coupling device so that the connection device is securely connected to the receiving port and/or an insertion aid of the receiving port in the connected position via the coupled first coupling device and second coupling device. This provides a corresponding connection to the receiving port or also to an insertion aid of the receiving port.

The "coupling device" in this context is, for example, a mechanical device in particular with a form fit which can also have additional sealing elements for sealing and ensuring sterility. The coupling device can, for example, have a bayonet lock, a click lock, or a plug-in lock. A "first" coupling device and "second" coupling device describe respective parts of the coupling device that are designed to correspond to each other on respective components that interact with each other, for example, the through-passage frame and the receiving port.

The present invention also provides a port system with a receiving port and a connection device as described above.

The present invention is explained in greater detail below with reference to exemplary embodiments as shown in the drawings.

A transfer device 101 is used to transfer, for example, bulk material goods (not shown), such as sealing plugs, into a receiving port or a sterilization device. The transfer device 101 has a film bag 103 which is attached via a connection region 104 to a through-passage frame 105. The through-passage frame 105 has a through-passage 106 through which corresponding sealing plugs can be fed or poured out of the film bag 103.

The through-passage frame 105 itself has an inner side 107 facing the through-passage 106. The through-passage frame 105 also has a connection side 108, an outer side 109 lying opposite the inner side 107, and a rear side 110 directed towards the film bag opposite the connection side 108.

The connection region 104 of the film bag 103 is securely connected to the through-passage frame 105 by a weld seam 121 on the connection side 108. Along a through-passage axis 383, which runs through the through-passage 106, it is thus possible to transfer the sealing plugs, for example, from the film bag 103 in a through-passage direction 385 without the corresponding sealing plugs getting stuck, for example, on an undercut or on an edge of the through-passage frame 105.

Alternatively or additionally, the connection region 104 of the film bag 103 can also be guided further around the through-passage frame 105 so that it not only covers the inner side 107 and the connection side 108, but is arranged around the through-passage frame 105, for example, up to the outer side 109 or also up to the rear side 110, and is also additionally fastened to the outer side 109 or the rear side 110, for example, with a weld seam and/or alternatively with an adhesive connection.

Figure 2:
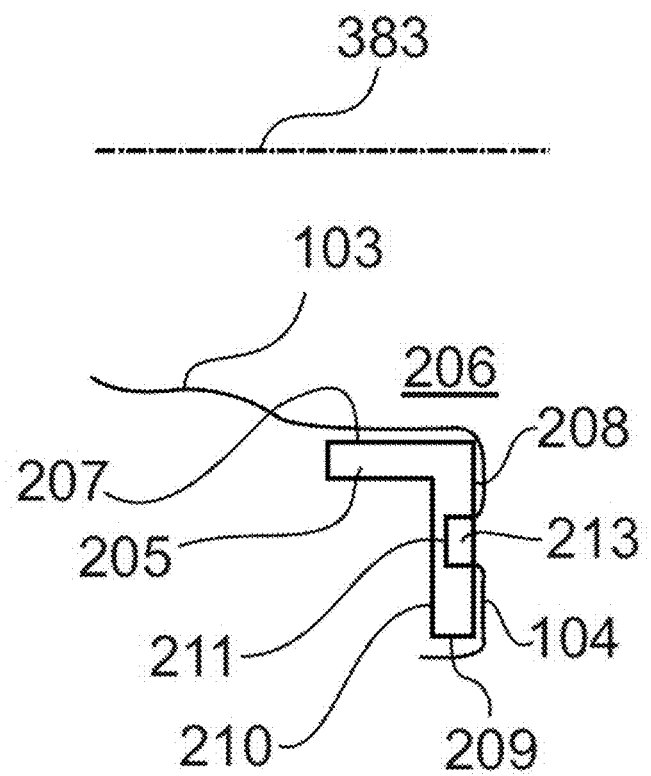
FIG. 2 shows a schematic sectional view of an alternative through-passage frame with a part of the film bag of FIG. 1.

An alternative through-passage frame 205 has a through-passage 206 and is basically constructed in the same way as the through-passage frame 105. According to a further embodiment (see FIG. 2), the film bag 103 is guided through the through-passage 206 past the inner side 207 to a connection side 208 and an outer side 209, wherein a ring 213 is clamped in an annular groove 211 in the connection side 208, i.e., axially to the through-passage axis 383. The connection region 104 of the film bag 103 is clamped between the ring 213 and the annular groove 211 so that a corresponding connection exists between the film bag 103 and the through-passage frame 205. The connection region 104 can also be secured, for example, on the outer side 209, with an adhesive connection or with a welded connection.

Figure 3:
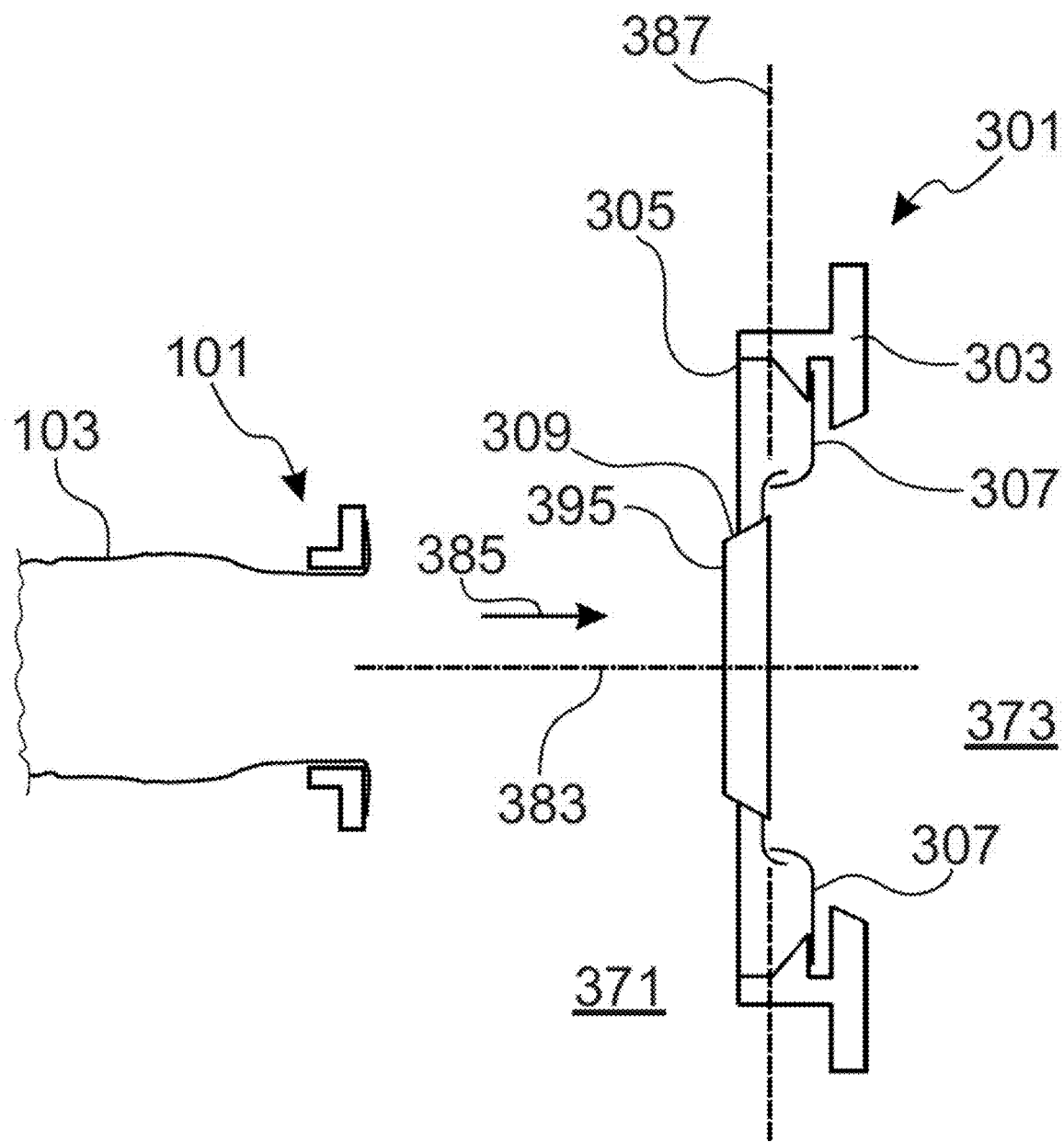
FIG. 3 shows a schematic sectional view of a transfer port with a transfer device of FIG. 1.

A transfer port 301 has a port ring 303 which forms a through-passage 305. The port ring 303 is arranged vertically, wherein an inclined or even horizontal arrangement is also possible to support the filling of goods into the transfer device 101. A gap cover 307 is arranged in the through-passage 305 and radially bridges a gap between the through-passage 305 and an insertion aid 309 so that no objects can there be inserted. The insertion aid 309 is arranged along an insertion aid axis 387, which is perpendicular to the through-passage axis 383, the insertion aid 309 forming an aperture 395 through which the goods from the film bag 103 can be inserted. Corresponding goods can thus be transferred from the film bag 103 from an outer region 371 of the transfer port 301 to an inner region 373 using the transfer device 101 (see FIG. 3).

Both the through-passage frame 105 and the through-passage frame 205 and, on the opposite side, the insertion aid 309, can, for example, be provided with a bayonet lock or a click lock so that the corresponding through-passage frame can be coupled to the insertion aid 309 easily and securely. This can also be a simple plug-in connection, for example, a conical design of the through-passage frame or an outer side of the respective through-passage frame.

The present invention is not limited to embodiments described herein; reference should be had to the appended claims.

LIST OF REFERENCE NUMERALS 101 transfer device
103 film bag
104 connection region
105 through-passage frame
106 through-passage
107 inner side
108 connection side
109 outer side
110 rear side
121 weld seam
205 through-passage frame
206 through-passage
207 inner side
208 connection side
209 outer side
210 rear side
211 annular groove
213 ring
301 transfer port
303 port ring
305 through-passage
307 gap cover
309 insertion aid
371 outer region
373 inner region
383 through-passage axis
385 through-passage direction
387 insertion aid axis
395 aperture

What is claimed is:

1. A connection device for transferring bulk material goods into a receiving port along a through-passage direction, the connection device comprising:
    a through-passage frame which is configured to guide the bulk material goods through a through-passage having a through-passage axis, the through-passage frame comprising,
        a connection side, a rear side,
an inner surface which is arranged to face the through-passage axis, and
an outer surface which is arranged to face away from the through-passage axis between the connection side and the rear side,
wherein,
in a connected position, the connection side faces the receiving port, the rear side faces away from the receiving port, and the through-passage direction extends from the rear side to the connection side; and
a holding bag which is configured to provide the bulk material goods, the holding bag comprising a film-type main body which is arranged on the rear side, the film-type main body comprising a connection region which is configured to be securely connected to the through-passage frame via a connection,
wherein,
the film-type main body is configured to be guided from the rear side along the through-passage direction, through the through-passage, and to the connection side, so that the connection region bears at least partially against the connection side, and the connection is arranged behind the through-passage along the through-passage direction.

2. The connection device as recited in claim 1, wherein at least one of the film-type main body and the connection region has or have a partial annular cross-section or an annular cross-section along the through-passage axis so that the at least one of the film-type main body and the connection region partially or completely embraces or embrace the through-passage frame along a circumference of the through-passage.

3. A port system comprising:
a receiving port; and
a connection device as recited in claim 1.

4. The connection device as recited in claim 1, wherein
the through-passage frame further comprises, on at least one of the connection side and on the outer surface, a first coupling device,
the receiving port has a second coupling device assigned thereto, and
the first coupling device is configured to be coupled to the second coupling device so that the connection device is securely connected to the receiving port via the first coupling device and the second coupling device.

5. The connection device as recited in claim 4, wherein the receiving port further comprises an insertion aid, and the first coupling device is configured to be coupled to the second coupling device so that the connection device is securely connected to the insertion aid of the receiving port via the first coupling device and the second coupling device.

6. The connection device as recited in claim 4, wherein at least one of the first coupling device and the second coupling device is or are at least one of a bayonet lock, a click lock, and a plug-in lock.

7. The connection device as recited in claim 1, wherein, at least one of,
the connection is arranged on the connection side, and
the connection region is guided around the through-passage frame as far as the outer surface or as far as the rear side,
so that the connection or a further connection or further connections is or are arranged on at least one of the outer surface and on the rear side.

8. The connection device as recited in claim 7, wherein at least one of the connection, the further connection, and the further connections is or are a welded connection.

9. The connection device as recited in claim 7, wherein at least one of the connection, the further connection, and the further connections is or are an adhesive connection.

10. The connection device as recited in claim 7, further comprising:
a retaining element,
wherein,
at least one of the connection, the further connection, and the further connections is or are at least one of a form-fitting plug-in connection and a frictionally engaged plug-in connection,
the through-passage frame further comprises a recess, and
the retaining element is configured to be inserted or pressed into the recess in the through-passage frame so as to provide the at least one of the form-fitting plug-in connection and the frictionally engaged plug-in connection.

11. The connection device as recited in claim 10, wherein the retaining element is a partially annular retaining ring or an annular retaining ring.

12. The connection device as recited in claim 11, wherein the partially annular retaining ring or the annular retaining ring has at least one of a rectangular retaining ring cross section, a square retaining ring cross section, and a round retaining ring cross-section.

* * * * *